United States Patent
Loftis et al.

(10) Patent No.: US 12,533,733 B2
(45) Date of Patent: Jan. 27, 2026

(54) COLLET

(71) Applicant: TECHTRONIC CORDLESS GP, Anderson, SC (US)

(72) Inventors: Jonathan Loftis, Pendleton, SC (US); Kwok Ting Mok, Hong Kong (CN); Long Long Hu, Dongguan (CN); Jia Ming Liao, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 708 days.

(21) Appl. No.: 17/852,809

(22) Filed: Jun. 29, 2022

(65) Prior Publication Data
US 2023/0001492 A1    Jan. 5, 2023

Related U.S. Application Data

(60) Provisional application No. 63/217,107, filed on Jun. 30, 2021.

(30) Foreign Application Priority Data

Feb. 22, 2022    (CN) .......................... 202220356367.7

(51) Int. Cl.
*B23B 31/20*    (2006.01)
(52) U.S. Cl.
CPC ........ *B23B 31/2012* (2021.01); *B23B 31/201* (2013.01); *B23B 2231/14* (2013.01); *Y10T 279/17299* (2015.01)
(58) Field of Classification Search
CPC .............. B23B 31/201; B23B 31/2012; B23B 31/20125; B23B 2231/14; Y10T 279/17299; Y10T 279/17504
See application file for complete search history.

(56) References Cited

U.S. PATENT DOCUMENTS 2,360,908 A * 10/1944 Merrick ............ B23B 31/20125
                                                        279/71
3,032,156 A    5/1962 Eriksson
(Continued)

FOREIGN PATENT DOCUMENTS

CA          3074375 A1    1/2010
CN          201108969     9/2008
(Continued)

OTHER PUBLICATIONS

Extended European Search Report for Application No. 22182075.6 dated Jun. 19, 2023 (10 pages).

*Primary Examiner* — Eric A. Gates
(74) *Attorney, Agent, or Firm* — Michael Best & Friedrich LLP

(57) ABSTRACT

A chuck for use with a rotary power tool having an output spindle. The chuck includes a base and an inner sleeve threadedly coupled to the base. The inner sleeve has a central aperture. A collet is disposed within the central aperture of the inner sleeve and configured to be engaged by a portion of the inner sleeve to be tightened or untightened. The chuck further includes an outer sleeve surrounding the inner sleeve, and a detent member disposed between the inner sleeve and the outer sleeve. The detent member is coupled for co-rotation with the outer sleeve and configured to selectively transmit torque from the outer sleeve to the inner sleeve. When the collet is tightened, rotation of the outer sleeve causes axial displacement of the detent member relative to the inner sleeve as the outer sleeve and the detent member rotate relative to the inner sleeve.

14 Claims, 11 Drawing Sheets

(56) References Cited

U.S. PATENT DOCUMENTS

| | | |
|---|---|---|
| 3,587,124 A | 6/1971 | Cox et al. |
| 4,277,074 A | 7/1981 | Kilberis |
| 4,682,918 A | 7/1987 | Palm |
| 5,174,424 A | 12/1992 | Eriksson |
| 5,195,624 A | 3/1993 | Eriksson |
| 5,407,215 A | 4/1995 | Yang |
| 5,624,125 A | 4/1997 | Rohm |
| 5,944,327 A * | 8/1999 | Kanaan ............ B23B 31/20125 279/54 |
| 7,360,770 B2 | 4/2008 | Luckenbaugh et al. |
| 7,699,566 B2 | 4/2010 | Nickels, Jr. et al. |
| 7,753,381 B2 | 7/2010 | Nickels, Jr. et al. |
| 7,757,374 B2 | 7/2010 | Luckenbaugh et al. |
| 8,038,156 B2 | 10/2011 | Nickels, Jr. et al. |
| 8,459,905 B2 | 6/2013 | Nickels, Jr. et al. |
| 8,465,492 B2 | 6/2013 | Estes |
| 8,714,566 B2 | 5/2014 | Campbell et al. |
| 9,332,996 B2 | 5/2016 | Estes |
| 10,047,908 B1 | 8/2018 | Bohle, II et al. |
| 10,080,568 B2 | 9/2018 | Estes |
| 10,363,609 B2 | 7/2019 | Rubens et al. |
| 2004/0194324 A1 | 10/2004 | Youn-Chyuan |
| 2006/0043684 A1 | 3/2006 | Barber et al. |
| 2006/0232022 A1 | 10/2006 | Nickels, Jr. et al. |
| 2008/0164662 A1 | 7/2008 | Luckenbaugh et al. |
| 2013/0207353 A1 | 8/2013 | Yaksich |
| 2014/0265162 A1 | 9/2014 | Rubens et al. |
| 2019/0111555 A1 | 4/2019 | Abbott |
| 2020/0086396 A1 | 3/2020 | Stanton et al. |

FOREIGN PATENT DOCUMENTS

| | | |
|---|---|---|
| DE | 8705901 | 6/1987 |
| DE | 3716313 | 11/1988 |
| DE | 4442533 | 6/1996 |
| WO | 2020245000 | 12/2020 |

\* cited by examiner

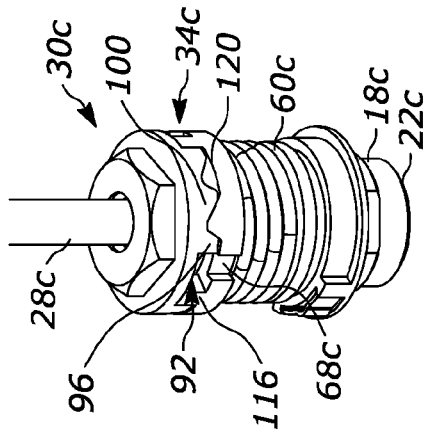
FIG. 17
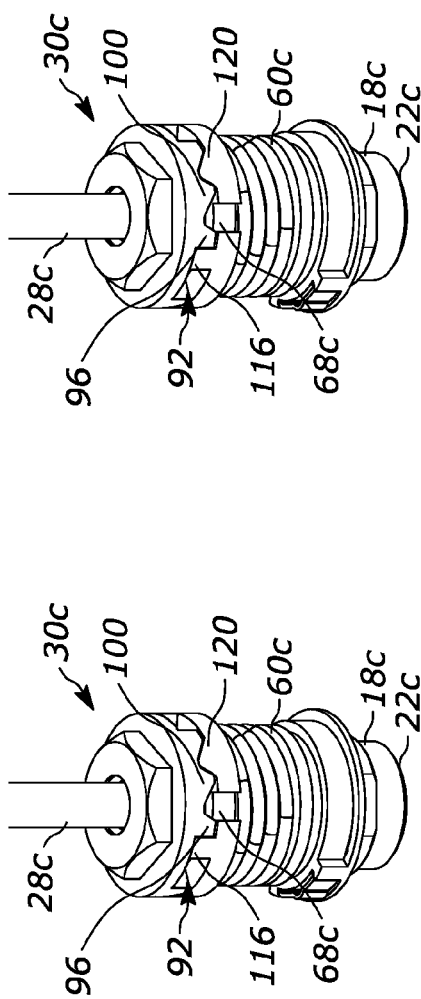
FIG. 18
FIG. 19
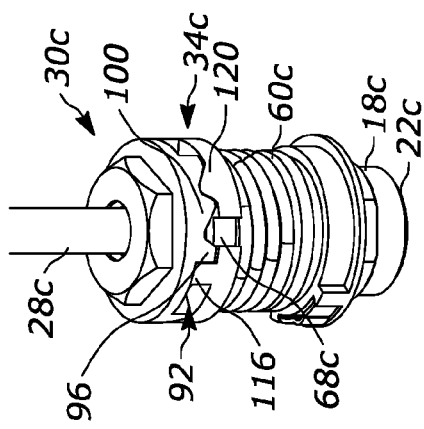
FIG. 20
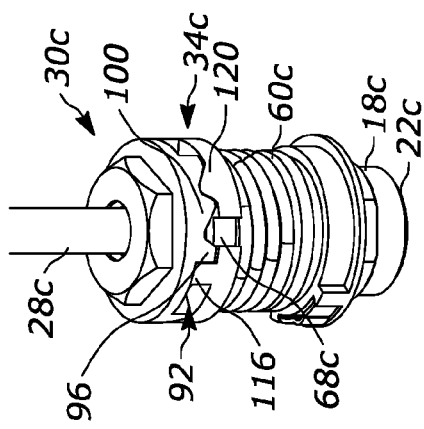
FIG. 21
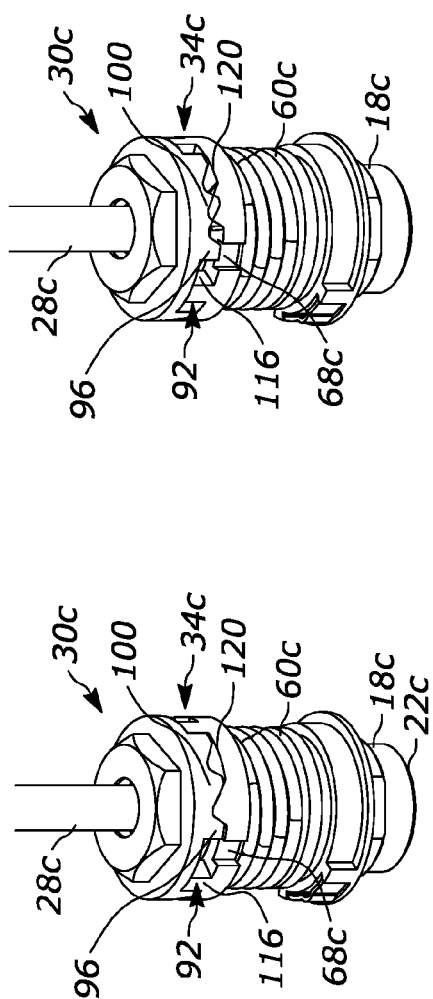
FIG. 22

COLLET

CROSS-REFERENCE TO RELATED APPLICATIONS

This application claims priority to U.S. Provisional Patent Application No. 63/217,107 filed on Jun. 30, 2021, the entire content of which is incorporated herein by reference.

FIELD OF THE INVENTION

The present invention relates to rotary power tools, and more particularly to tool bit holders for use with rotary power tools.

BACKGROUND OF THE INVENTION

Rotary power tools traditionally utilize bit holders, such as a collet or a chuck, to secure a working tool bit, such as a drill bit, for co-rotation with an output of the rotary power tool.

SUMMARY OF THE INVENTION

The present invention provides, in one aspect, a chuck for use with a rotary power tool having an output spindle. The chuck includes a base configured to be coupled to the output spindle and an inner sleeve coupled to the base. The inner sleeve has a central aperture. A collet is disposed within the central aperture of the inner sleeve and configured to be engaged by a portion of the inner sleeve to be tightened or untightened. A detent member is configured to transmit torque to the inner sleeve to tighten or untighten the collet. The detent member is axially displaceable relative to the inner sleeve in response to rotation between the detent member and the inner sleeve to create tactile feedback. An outer sleeve is disposed radially outside the inner sleeve. The outer sleeve is at least partially rotationally fixed to the detent member such that rotation of the outer sleeve transmits torque to the detent member causing rotation of the detent member. The detent member transmits torque from the outer sleeve to the inner sleeve to tighten the collet, and, when the collet is tightened, rotation of the outer sleeve results in rotation of the detent member relative to the inner sleeve, thereby axially displacing the detent member away from the inner sleeve then towards the inner sleeve to create the tactile feedback.

The present invention provides, in another aspect, a chuck for use with a rotary power tool having an output spindle. The chuck includes a base and an inner sleeve threadedly coupled to the base. The inner sleeve has a central aperture. A collet is disposed within the central aperture of the inner sleeve and configured to be engaged by a portion of the inner sleeve to be tightened or untightened. The chuck further includes an outer sleeve surrounding the inner sleeve, and a detent member disposed between the inner sleeve and the outer sleeve. The detent member is coupled for co-rotation with the outer sleeve and configured to selectively transmit torque from the outer sleeve to the inner sleeve. When the collet is tightened, rotation of the outer sleeve causes axial displacement of the detent member relative to the inner sleeve as the outer sleeve and the detent member rotate relative to the inner sleeve.

The present invention provides, in yet another aspect, a chuck for use with a rotary power tool having an output spindle. The chuck includes a base configured to be coupled to the output spindle and an inner sleeve threadedly coupled to the base. The inner sleeve has a central aperture and a first toothed portion extending circumferentially about the central aperture. A collet is disposed within the central aperture of the inner sleeve and configured to be engaged by a portion of the inner sleeve to be tightened or untightened. An outer sleeve extends around the inner sleeve and is axially movable relative to the inner sleeve. The outer sleeve includes a second toothed portion configured to selectively engage the first toothed portion. Engagement of the first toothed portion and the second toothed portion couples the inner sleeve for co-rotation with the outer sleeve.

Other features and aspects of the invention will become apparent by consideration of the following detailed description and accompanying drawings.

BRIEF DESCRIPTION OF THE DRAWINGS

FIG. 17 is another perspective view of the chuck of FIG. 7, with the outer sleeve hidden for clarity.

FIG. 18 is yet another perspective view of the chuck of FIG. 7, with the outer sleeve hidden for clarity and the detent ring slipping in a tightening direction.

FIG. 19 is yet another perspective view of the chuck of FIG. 7, with the outer sleeve hidden for clarity and the detent ring in a post-slipping position.

FIG. 20 is yet another perspective view of the chuck of FIG. 7, with the outer sleeve hidden for clarity.

FIG. 21 is yet another perspective view of the chuck of FIG. 7, with the outer sleeve hidden for clarity and the detent ring slipping in a loosening direction.

FIG. 22 is yet another perspective view of the chuck of FIG. 7, with the outer sleeve hidden for clarity and the detent ring in a post-slipping position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

In the following detailed description of the embodiments, depictions are given with reference to accompanying drawings which constitute a part of the description. The drawings show, by way of example, specific embodiments in which the present invention is implemented. The illustrated embodiments are not intended to exhaust all embodiments in accordance with the present invention. It is to be understood that other embodiments may be utilized and structural or logical changes may be made without departing from the scope of the present invention. With respect to the drawings, directional terms, such as "up", "down", "left" and "right" etc., are used with reference to the orientations of the described drawings. Since components of embodiments of the present invention can be implemented in a variety of orientations, these directional terms are used for purposes of illustration, not for limitation. Accordingly, the following specific embodiments are not intended to limit, and the scope of the present invention is defined by the appended claims.

Figure 1:
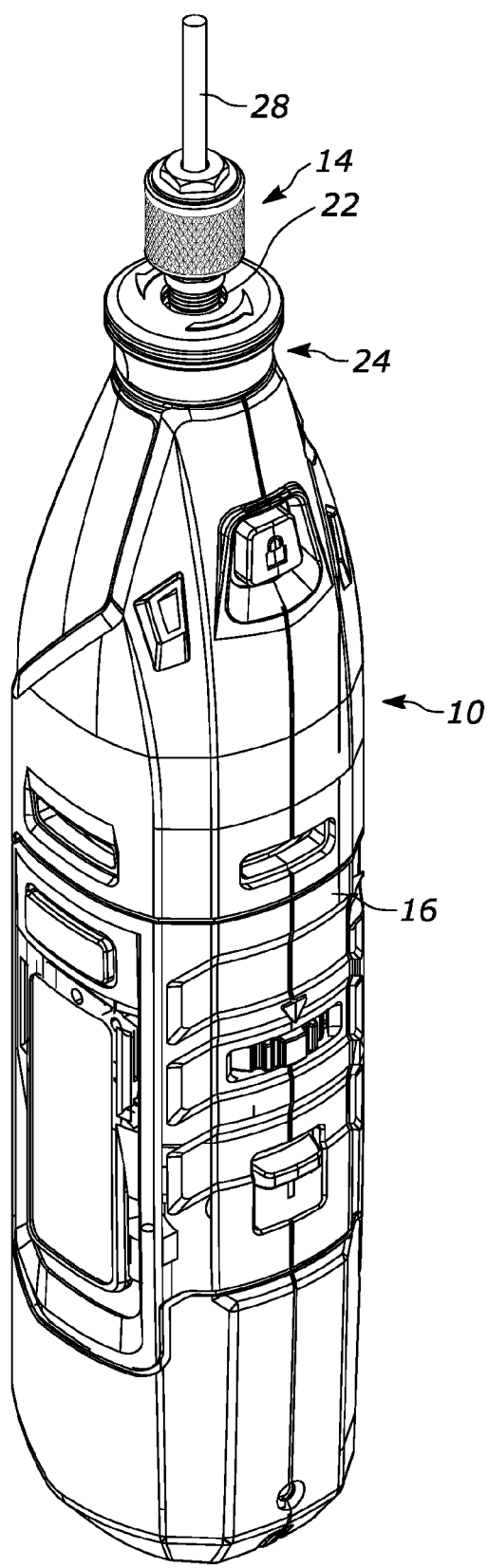
FIG. 1 is a perspective view of a rotary power tool including a chuck according to one embodiment of the present disclosure.
Figure 2:
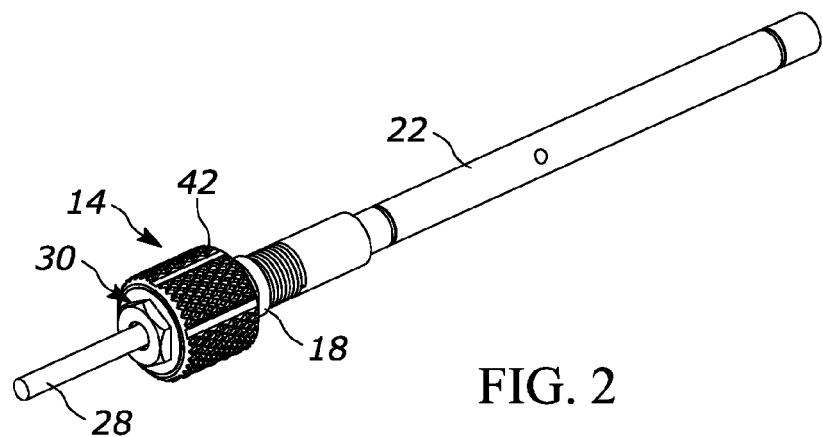
FIG. 2 is a perspective view of the chuck of FIG. 1, including a tool bit and an output shaft of a rotary power tool.

FIG. 1 depicts a rotary power tool 10 including a tool bit holder, illustrated as a chuck 14, for securing a working tool bit 28. The illustrated rotary power tool 10 includes a housing 16 supporting an electric motor (not shown) and a battery pack (not shown). The battery pack selectively provides power to the electric motor to drive the electric motor which, in turn, drives an output spindle 22. The output spindle 22 extends through a nose portion 24 of the housing 16 to be coupled to the chuck 14. The chuck 14 is secured to the output spindle 22 for co-rotation therewith, and the chuck 14 selectively secures the working tool bit 28 (e.g., a grinding wheel) so that rotation of the electric motor results in rotation of the working tool bit 28. The chuck 14 further includes a mechanism for providing feedback to an operator to indicate that the working tool bit 28 has been properly secured within the chuck 14.

With reference to FIGS. 2-5, the chuck 14 includes a base 18 threaded to the spindle 22. The base 18 includes a central aperture 20 in which a collet 26 is disposed. In some embodiments, the base 18 is integrally formed with the spindle 22. Surrounding the collet 26 and a portion of the base 18 is an inner sleeve 30. The inner sleeve 30 includes a central aperture 32 having a threaded portion 36 (FIG. 5) to allow the inner sleeve 30 to be threaded to the base 18 and a tapered (e.g., frustoconical) portion 38 engageable with the collet 26. When the tapered portion 38 engages the collet 26, the collet 26 is driven radially inwards to apply a clamping force to the working tool bit 28 and tighten the collet 26. To remove the working tool bit 28 from the chuck 14, the tapered portion 38 is disengaged from the collet 26, untightening the collet 26 and removing the clamping force from the working tool bit 28.

Figure 3:
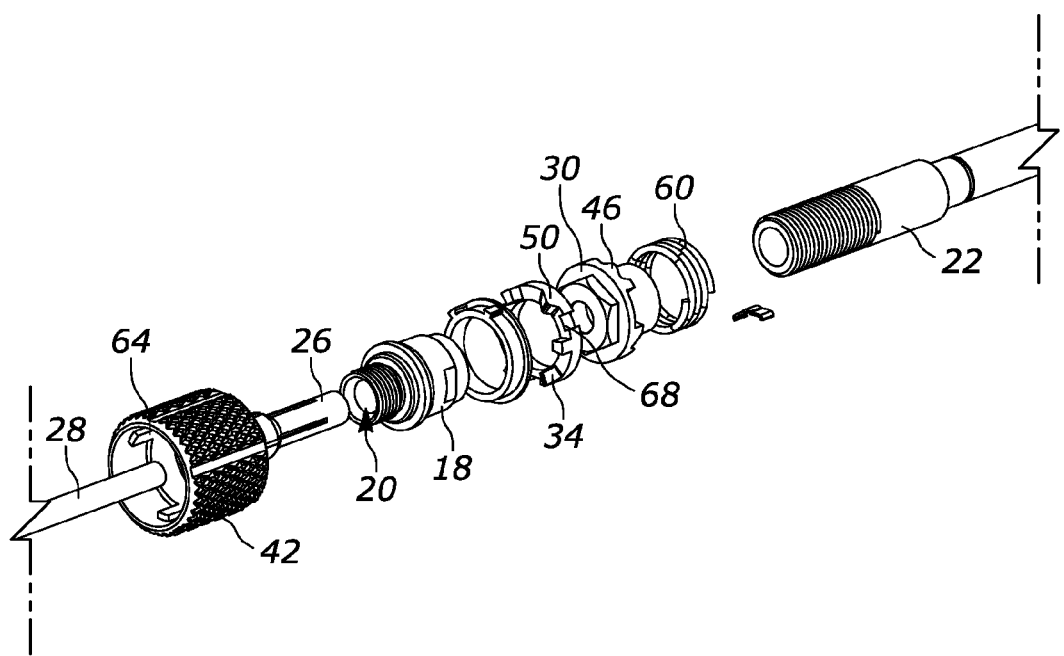
FIG. 3 is an exploded view of the chuck of FIG. 2.
Figure 4:
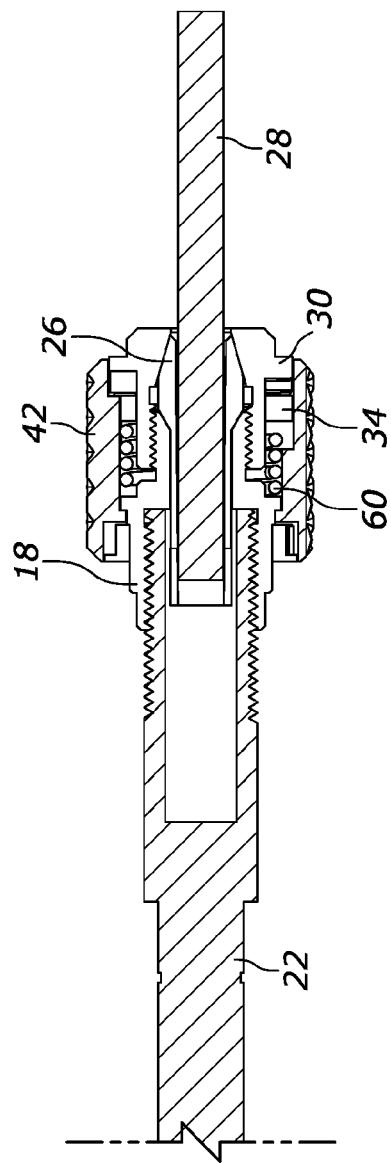
FIG. 4 is a cross-sectional view of the chuck of FIG. 2.
Figure 5:
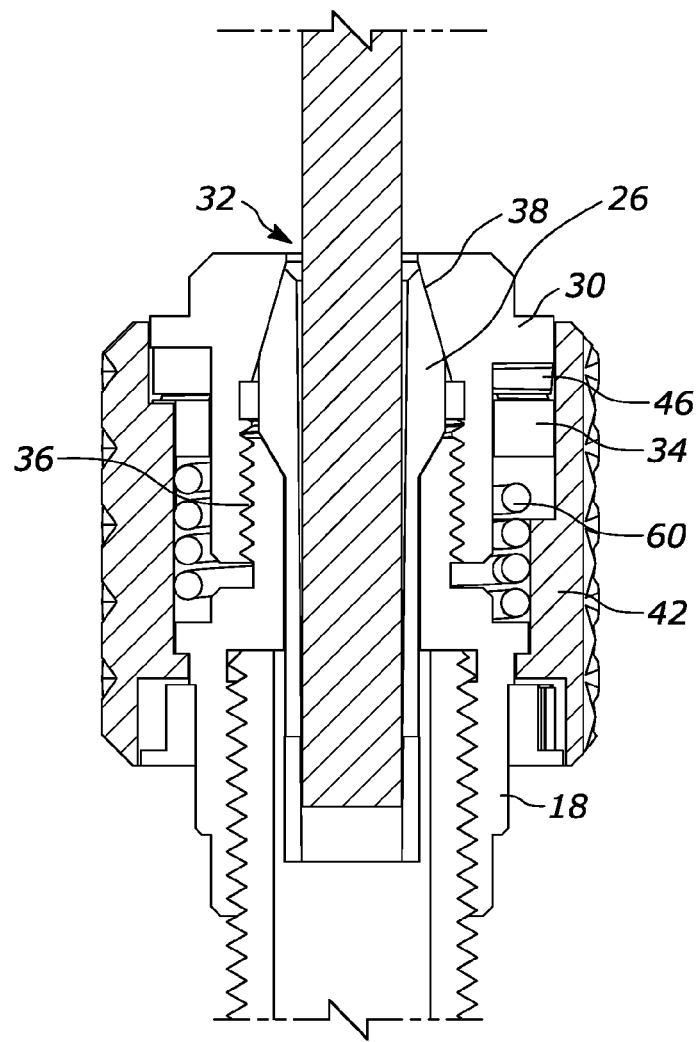
FIG. 5 is a close-up view of FIG. 4.

The inner sleeve 30 further includes a first toothed portion 46 (e.g., a face gear) oriented perpendicular to an axis of rotation of the chuck 14. Circumferentially surrounding the inner sleeve 30 is a detent member, illustrated as a ring 34. The detent ring 34 includes a second toothed portion 50 (e.g., another face gear) that corresponds to the first toothed portion 46 of the inner sleeve 30. The first and second toothed portions 46, 50 selectively rotationally couple the inner sleeve 30 and the detent ring 34. More particularly, the first and second toothed portions 46, 50 are each shaped as a plurality of saw teeth. A biasing member, illustrated as a compression spring 60, applies a biasing force on the detent ring 34 to engage the detent ring 34 with the inner sleeve 30. The chuck 14 further includes an outer sleeve 42 coupled to the detent ring 34. The outer sleeve 42 is at least partially rotationally fixed to the detent ring 34 such that rotation of the outer sleeve 42 causes rotation of the detent ring 34. In the illustrated embodiment, the outer sleeve 42 includes a plurality of circumferentially spaced keys 64 which interact with a plurality of circumferentially spaced slots 68 on the detent ring 34 (FIG. 3). The keys 64 and slots 68 are axially aligned such that the detent ring 34 is secured for co-rotation with the outer sleeve 42 and is capable of axial motion with respect to the outer sleeve 42. In some embodiments, the outer sleeve 42 is capable of limited rotation relative to the detent ring 34.

In operation, a user rotates the outer sleeve 42 to tighten or loosen the chuck 14. When rotated in a tightening direction, the detent ring 34 co-rotates with the outer sleeve 42 and imparts a rotational torque on the inner sleeve 30 due to the interaction of the first and second toothed portions 46, 50. Rotation of the inner sleeve 30 drives the inner sleeve 30 axially along the base 18 due to the threaded connection with the base 18. The axial motion results in the tapered portion 38 engaging the collet 26 and applying a radial clamping force to tighten the collet 26. When the chuck 14 reaches a threshold clamping force of the collet 26 on the working tool bit 28 (e.g., is fully tightened), the first and second toothed portions 46, 50 will slip relative to one another. The slip occurs because the inner sleeve 30 is rotationally secured due to the tightness of the collet 26 and the detent ring 34 is rotating with the outer sleeve 42. The sawtooth shape of the first toothed portion 46 and the second toothed portion 50 drives the second toothed portion 50, and ultimately the detent ring 34, axially rearwards against the biasing force of the spring 60. Movement of the detent ring 34 axially rearwards disengages the first and second toothed portions 46, 50. As the detent ring 34 continues to rotate with the outer sleeve 42, the spring 60 drives the detent ring 34 toward the inner sleeve 30 to re-engage the first and second toothed portions 46, 50, causing a tactile feedback (e.g., a noise or impact sensed by the user) to indicate that the collet 26 is properly tightened.

To loosen or untighten the collet 26, the outer sleeve 42 is rotated in a loosening direction, opposite the tightening direction. Torque from the outer sleeve 42 is transmitted to the inner sleeve 30 via the detent member 34. In particular, the sawtooth shape of the first and second toothed portions 46, 50 transmits torque from the detent ring 34 to the inner sleeve 30 until the detent ring 34 slips relative to the inner sleeve 30.

Figure 6:
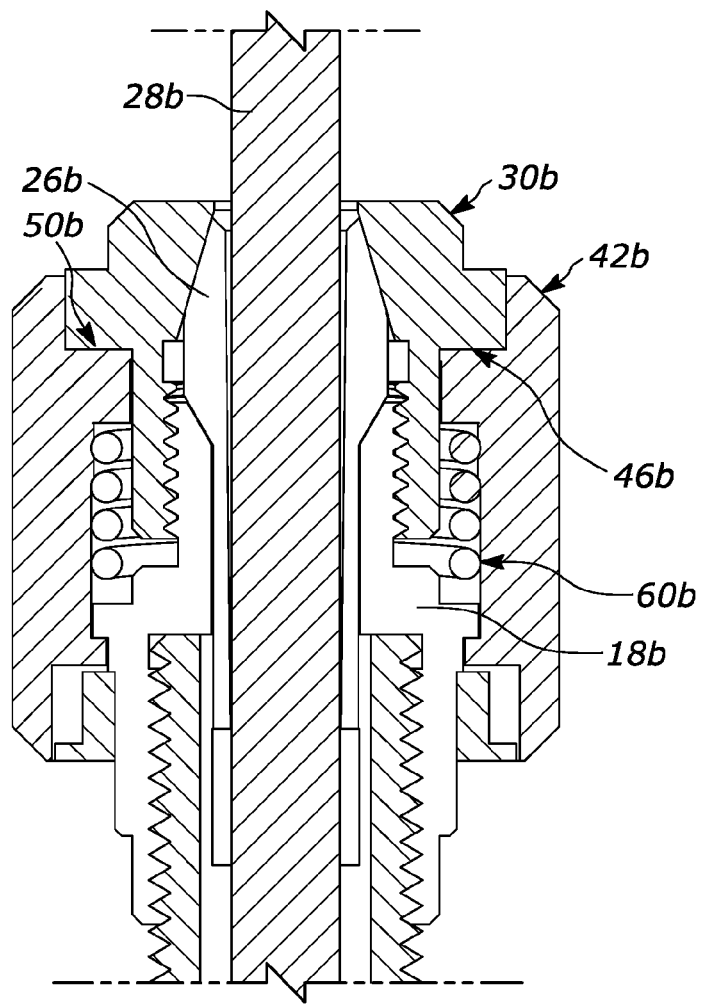
FIG. 6 is a cross-sectional view of a chuck according to another embodiment of the present disclosure, including a tool bit and an output shaft of a rotary power tool.
Figure 7:
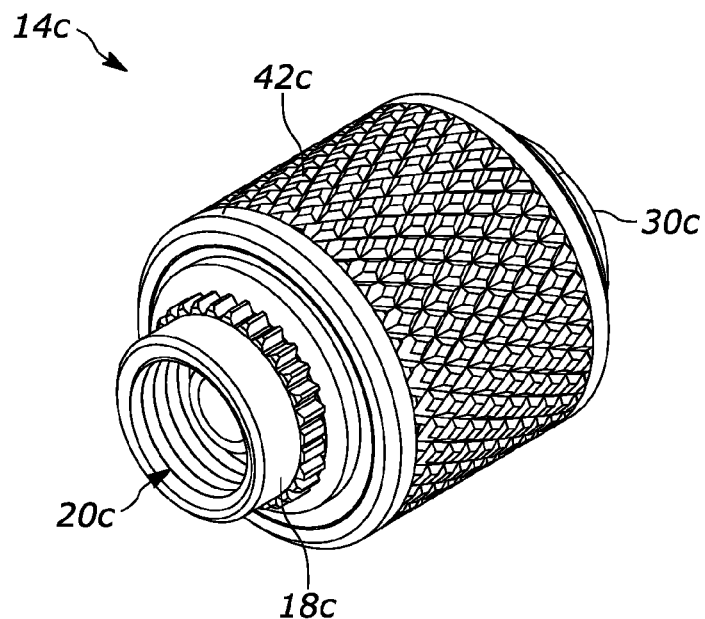
FIG. 7 is a rear perspective view of a chuck according to yet another embodiment of the present disclosure.
Figure 8:
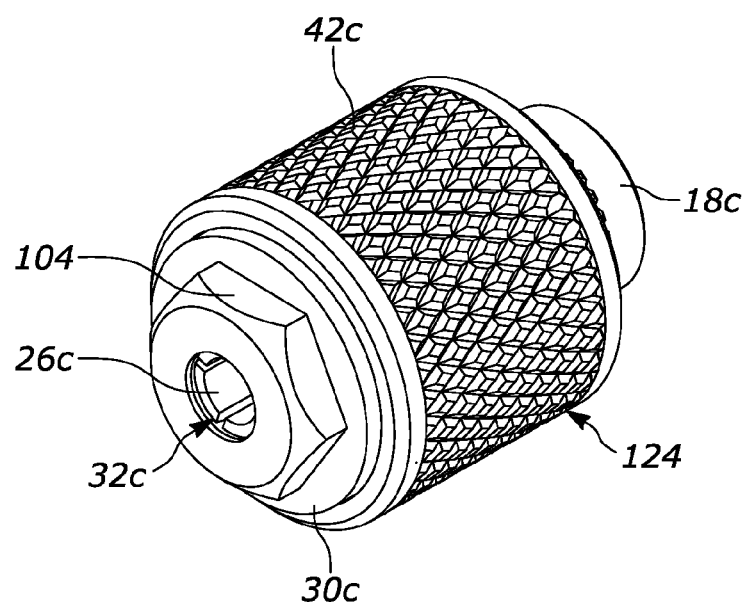
FIG. 8 is a front perspective view of the chuck of FIG. 7.
Figure 9:
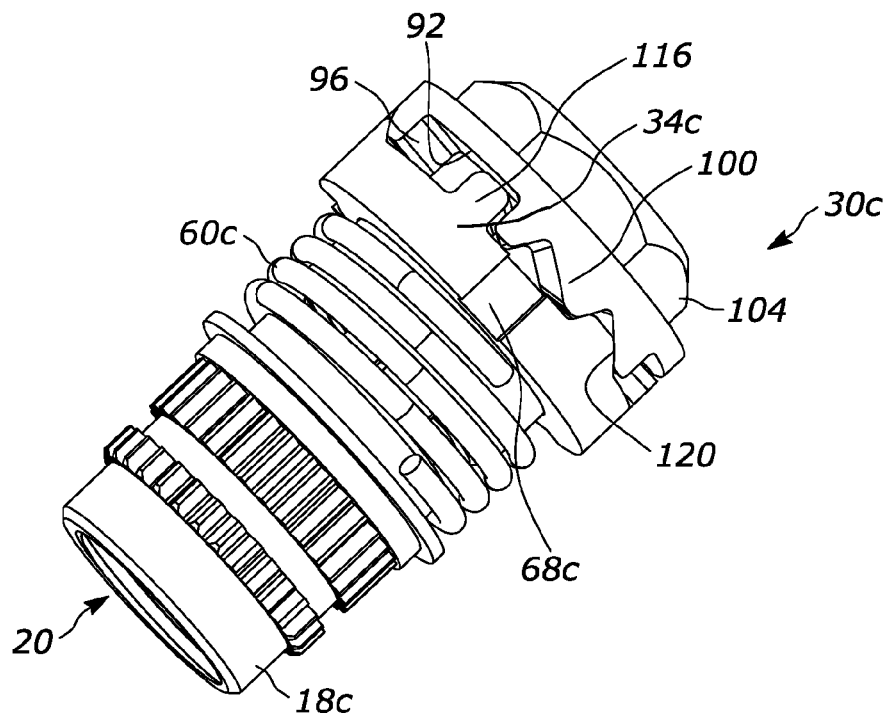
FIG. 9 is a perspective view of the chuck of FIG. 7 with the outer sleeve hidden for clarity.
Figure 10:
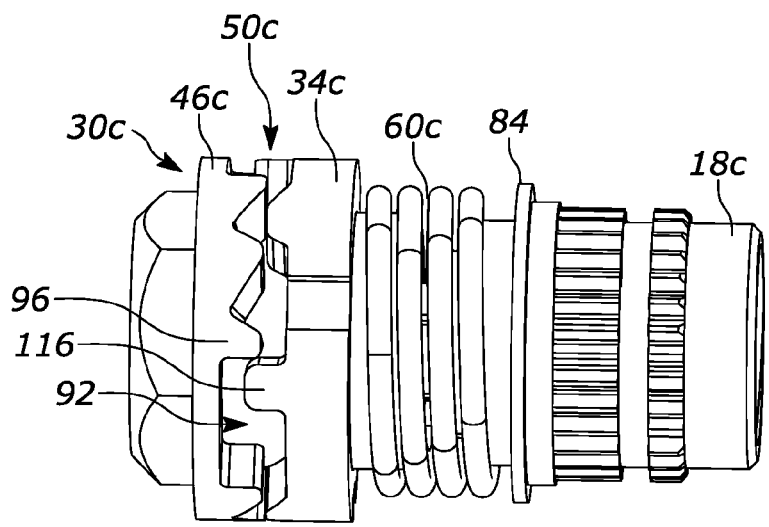
FIG. 10 is a side view of the chuck of FIG. 9, with the detent ring in a slipping position.

FIG. 6 depicts another embodiment of the chuck 14b, with like parts having like reference numerals plus the letter "b", and the following differences explained below. The outer sleeve 42b includes an integrally formed toothed portion 50b configured to interface with the toothed portion 46b of the inner sleeve 30b. The spring 60b is configured to bias the outer sleeve 42b such that the toothed portion 50b engages the toothed portion 46b on the inner sleeve 30b. The embodiment of FIG. 6 does not include a separate detent ring 34, thereby reducing the number of components. Operation of the chuck 14b is like the embodiment of FIGS. 1-5. Specifically, to tighten the chuck 14b, a user rotates the outer sleeve 42b in a tightening direction to impart a torque on the inner sleeve 30*b* to drive the inner sleeve 30*b* axially due to its threaded connection to the base 18*b*. The axial motion results in the inner sleeve 30*b* imparting a radial clamping force on the collet 26*b*. When the clamping force reaches a predetermined value, the reaction torque of the toothed portion 46*b* of the inner sleeve 30*b* on the toothed portion 50*b* of the outer sleeve 42*b* will overcome the biasing force of the spring 60*b*, thereby driving the outer sleeve 42*b* axially rearwards. As the outer sleeve 42*b* continues to rotate, the spring 60*b* drives the toothed portion 50*b* of the outer sleeve 42*b* back into engagement with the toothed portion 46*b* of the inner sleeve causing a tactile feedback sensed by the user.

FIGS. 7-16 depict yet another embodiment of a chuck 14*c*, with like parts having like reference numerals plus the letter "c" appended thereon, and the following differences explained below. Like the chuck 14 of FIGS. 1-5, the chuck 14*c* includes a base 18*c*, an inner sleeve 30*c* coupled to the base 18*c*, a collet 26*c* disposed within the base 18*c* and the inner sleeve 30*c*, a detent ring 34*c* surrounding a portion of the inner sleeve 30*c*, and an outer sleeve 42*c* disposed about the inner sleeve 30*c* and the base 18*c*. The outer sleeve 42*c* is selectively rotationally coupled to the inner sleeve 30*c* via the detent ring 34*c*. When the outer sleeve 42*c* is rotated in a tightening direction, the detent ring 34*c* transmits torque to the inner sleeve 30*c* until the collet 26*c* is tightened. Once the collet 26*c* is tightened, the detent ring 34*c* slips relative to the inner sleeve 30*c* to cause a tactile feedback and indicate to a user that the working tool bit 28*c* is secured within the chuck 14*c*. Various elements of the chuck 14*c* are described in further detail below. However, it should be understood that these are merely exemplary embodiments of the base 18*c*, the inner sleeve 30*c*, the outer sleeve 42*c*, and the detent ring 34*c*. Therefore, some of the details and features described herein are considered non-essential and may not be included in other embodiments.

Figure 11:
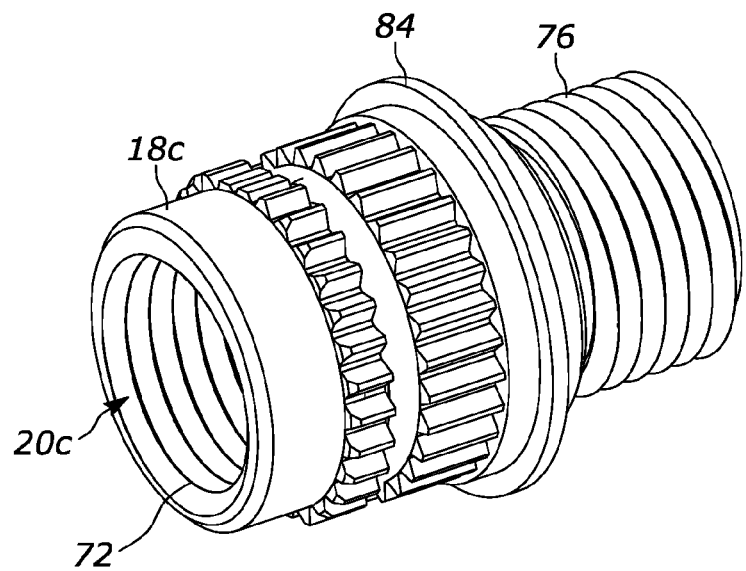
FIG. 11 is a perspective view of a base of the chuck of FIG. 7.
Figure 12:
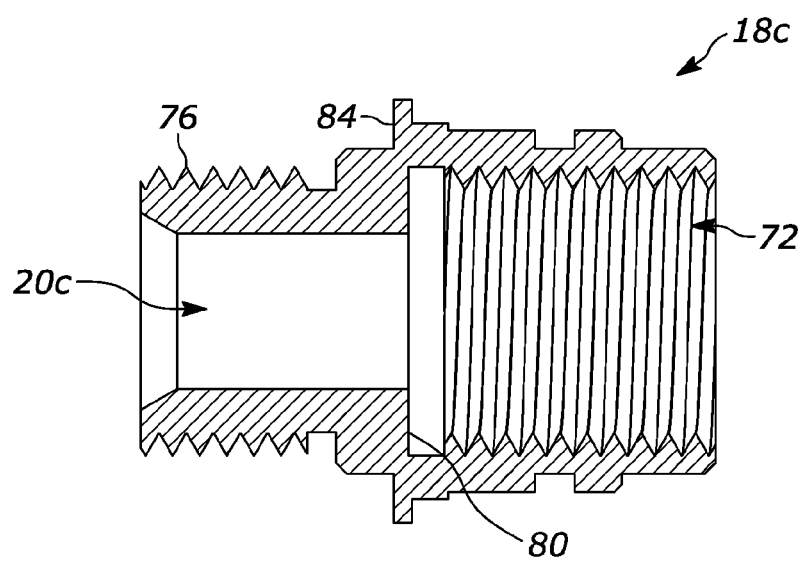
FIG. 12 is a cross-sectional view of the base of FIG. 11.

FIGS. 11-12 depict the base 18*c* in further detail. The base 18*c* is connectable to a spindle 22*c* (e.g., output) of a rotary power tool 10*c* to transmit rotation from the spindle 22*c* to a working tool bit 28*c* that is secured within the chuck 14*c*. The base 18*c* includes a central aperture 20*c* having an internally threaded end 72 configured to couple the base 18*c* to the output spindle 22*c*. The base 18*c* further includes an externally threaded end 76, opposite the internally threaded end 72, configured to couple the inner sleeve 30*c* to the base 18*c*. The central aperture 20*c* extends along a longitudinal axis of the base 18*c* and receives the collet 26*c* therein. In the illustrated embodiment, the central aperture 20*c* has a larger radius at the internally threaded end 72 than at the externally threaded end 76. However, in other embodiments the radius may be uniform. An annular shoulder 80 is formed at the point of change between the larger and smaller radii. In the illustrated embodiment, the change occurs approximately centrally between longitudinal extents of the base 18*c*. The annular shoulder 80 functions as a stop mechanism when threading the base 18*c* onto the output spindle 22*c*. In other words, the annular shoulder 80 contacts the output spindle 22*c* when the base 18*c* is fully threaded onto the output spindle 22*c*. A radial protrusion or seat 84 extends outside the base 18*c* approximately aligned with the annular shoulder 80. The seat 84 assists with alignment of the outer sleeve 42*c* relative to the base 18*c* and secures the biasing member 60*c* relative to the base 18*c*.

Figure 13:
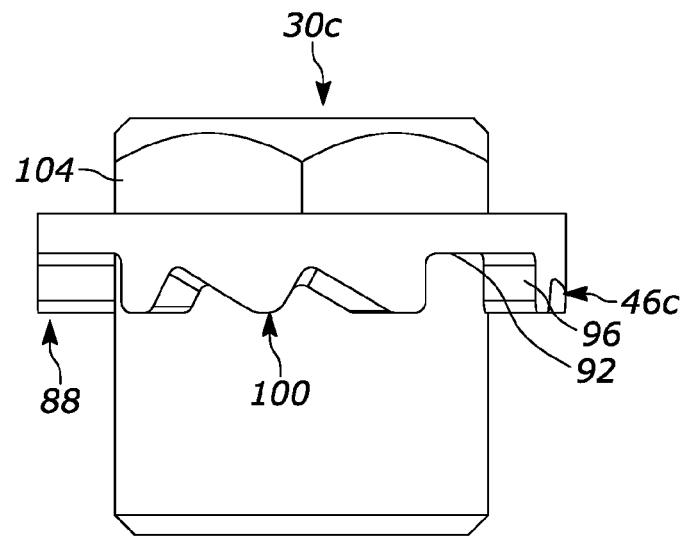
FIG. 13 is a perspective view of an inner sleeve of the chuck of FIG. 7.
Figure 14:
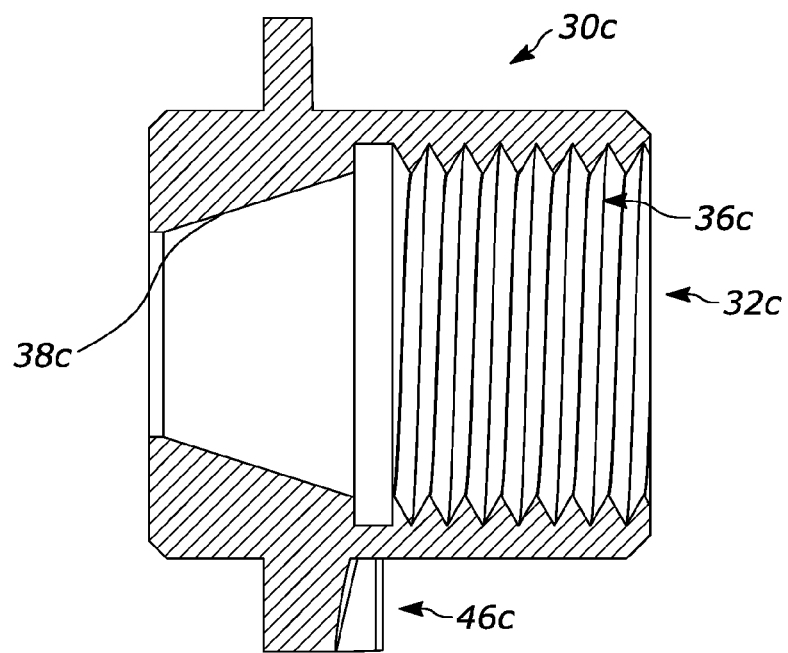
FIG. 14 is a cross-sectional view of the inner sleeve of FIG. 13.

FIGS. 13-14 depict the inner sleeve 30*c* in further detail. As mentioned above, the inner sleeve 30*c* is threaded to the base 18*c*. A longitudinally extending central aperture 32*c* of the inner sleeve 30*c* includes a threaded portion 36*c*, which is threaded to the threaded end 76 of the base 18*c*, and a tapered (e.g., frustoconical) portion 38*c*, which is engageable with the collet 26*c*. When threaded to the base 18*c*, the central aperture 32*c* of the inner sleeve 30*c* is aligned with the central aperture 20*c* of the base 18*c* to receive the collet 26*c* therein. The tapered portion 38*c* decreases the radius of the central aperture 32*c* and is configured to engage the collet 26*c* when the chuck 14*c* is tightened.

Figure 15:
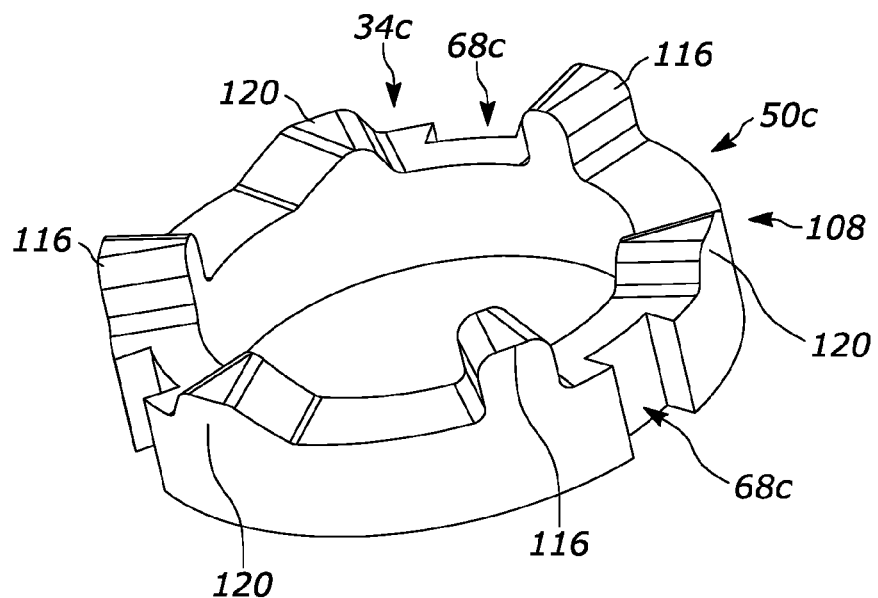
FIG. 15 is a perspective view of a detent ring of the chuck of FIG. 7.

The inner sleeve 30*c* further includes a toothed portion 46*c* on an outer surface of the inner sleeve 30*c*. The toothed portion 46*c* is annular and extends around the rotational axis of the inner sleeve 30*c* and, as mentioned above, is engageable with a toothed portion 50*c* of the detent ring 34*c* (FIG. 15). More particularly, the toothed portion 46*c* includes a plurality of teeth 88 spaced apart by a plurality of gaps 92 (FIG. 13). Adjacent each gap 92 is a vertical tooth 96. Between adjacent vertical teeth 96 are a plurality of inclined teeth 100. The teeth 88 extend from the inner sleeve 30*c* in a rearward direction. In other words, the teeth 88 extend toward the rotary tool 10*c* when the chuck 14*c* is coupled to the rotary tool 10*c*. Finally, the inner sleeve 30*c* includes a plurality of wrench flats 104 to allow the chuck 14*c* to be tightened or loosened with a traditional collet wrench, rather than through the feedback mechanism described herein.

FIG. 15 depicts the detent ring 34*c* in further detail. In the illustrated embodiment, the detent ring 34*c* includes a toothed portion 50*c* having a plurality of teeth 108 configured to engage the teeth 88 of the inner sleeve 30*c*. The detent ring 34*c* further includes a plurality of keyways or slots 68*c* configured to engage the outer sleeve 42*c*. The teeth 108 include vertical teeth 116 alternating with inclined teeth 120, and the teeth 108 extend from the detent ring 34*c* in a direction toward the plurality of teeth 88 of the inner sleeve 30*c*, when the detent ring 34*c* is surrounding the inner sleeve 30*c*. The vertical teeth 116 extend further from the detent ring 34*c* than the inclined teeth 120, and the vertical teeth 116 are circumferentially positioned to be aligned with the gaps 92 in the toothed portion 46*c* of the inner sleeve 30*c*, while the inclined teeth 120 are circumferentially positioned to be aligned with the inclined teeth 100 of the toothed portion 46*c* of the inner sleeve 30*c*. The increased length of the vertical teeth 116, relative to the inclined teeth 120, prevents misalignment of the detent ring 34*c* and the inner sleeve 30*c*. In particular, the inclined teeth 120 are aligned with one of the inclined teeth 100 of the inner sleeve 30*c*. As will be described in greater detail herein, the inclined teeth 120 engage an adjacent one of the inclined teeth 100 when the detent ring 34*c* slips relative to the inner sleeve 30*c*. The gaps 92 are sized to maintain alignment with the vertical teeth 116 during slipping of the detent ring 34*c*, preventing misalignment of the detent ring 34*c* and the inner sleeve 30*c*. After slipping of the detent ring 34*c*, the vertical teeth 96, 116 are engaged to allow further tightening of the chuck 14*c*.

With continued reference to FIG. 15, the slots 68*c* are cut into an outer circumferential surface of the detent ring 34*c* and extend parallel to the rotational axis of the detent ring 34*c*. The slots 68*c* engage the outer sleeve 42*c* to secure the detent ring 34*c* for co-rotation with the outer sleeve 42*c* while allowing axial movement of the detent ring 34*c* relative to the outer sleeve 42*c*. The illustrated embodiment includes three slots 68 spaced about the circumference of the detent ring 34*c*.

Figure 16:
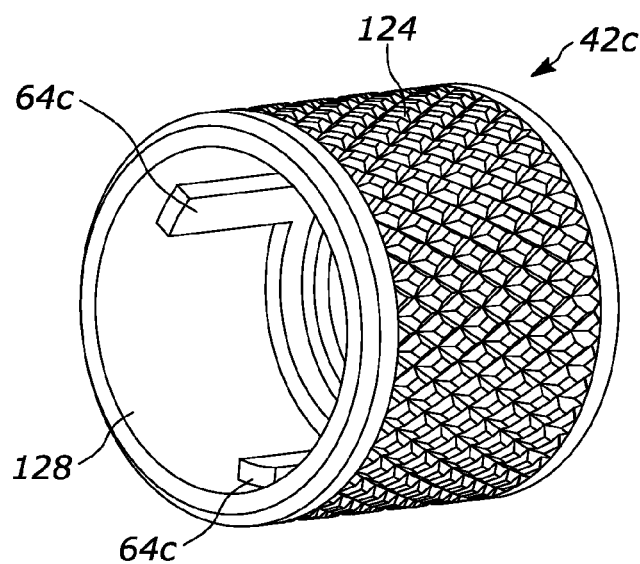
FIG. 16 is a rear perspective view of an outer sleeve of the chuck of FIG. 7.

FIG. 16 depicts the outer sleeve 42*c* in further detail. The outer sleeve 42*c* is generally cylindrical in shape. A radially outer surface 124 is knurled to facilitate a user rotating the outer sleeve 42*c*. In some embodiments, the outer sleeve 42*c* may have different textures or may be smooth. Extending radially inwards from an inner wall 128 of the outer sleeve 42*c* are a plurality of projections or keys 64*c*. The keys 64*c* are sized to fit within the slots 68*c* of the detent ring 34*c*, thereby rotationally fixing the detent ring 34*c* and the outer sleeve 42*c*. Each key 64*c* is a rectangular projection that extends parallel to a longitudinal axis of the outer sleeve 42*c*. As the detent ring 34*c* moves axially while slipping, the detent ring 34*c* remains rotationally fixed to the outer sleeve 42*c*. In some embodiments, the outer sleeve 42*c* is only partially rotationally fixed to the detent ring 34*c* and capable of limited rotational movement (e.g., 5-30 degrees) relative to the detent ring 34*c*.

FIGS. 17-19 depict a tightening operation of the chuck 14*c*. In operation, the inner sleeve 30*c* is threaded to the base 18*c*. The detent ring 34*c* is rotatably disposed about the inner sleeve 30*c* so that the toothed portion 50*c* of the detent ring 34*c* is engageable with the toothed portion 46*c* of the inner sleeve 30*c*. As such, when the detent ring 34*c* rotates in a tightening direction (e.g., fastening a tool bit) due to rotation of the outer sleeve 42*c*, the inclined teeth 100 of the first tooth portion 46*c* and the inclined teeth 120 of the second tooth portion 50*c* are engaged to transmit torque to the inner sleeve 30*c*, thereby causing rotation of the inner sleeve 30*c*. Such rotation of the inner sleeve 30*c* cases the inner sleeve 30*c* to move axially along the base 18*c*. The axial movement of the inner sleeve 30*c* causes the inwardly tapered portion 38*c* to apply a radial clamping force to the collet 26*c*, tightening the collet 26*c* about the working tool bit 28*c*. Once the collet 26*c* is fully tightened, continued rotation of the outer sleeve 42*c* will drive the second tooth portion 50*c* to slip relative to the first tooth portion 46*c*. In particular, the inner sleeve 30*c* stops rotating relative to the base 18*c* when the collet 26*c* is tightened. The angle of the inclined teeth 100, 120 drives the detent ring 34*c* axially rearwards when the outer sleeve 42*c* is rotated while the inner sleeve 30*c* is stationary. The detent ring 34*c* is driven rearwards until the inclined teeth 100, 120 are disengaged. At this point, further rotation of the outer sleeve 42*c* aligns the inclined teeth 120 with an adjacent one of the inclined teeth 100, and the biasing member 60*c* drives the second toothed portion 50*c* back into engagement with the first toothed portion 46*c*. During this process, the detent ring 34*c* has rotated relative to the inner sleeve 30*c*; however, the vertical teeth 116 maintain their position within the gaps 92. In other words, after the detent ring 34*c* slips relative to the inner sleeve 30*c*, the vertical teeth 96, 116 are engaged (FIG. 19). This engagement allows for continued rotation of the outer sleeve 42*c*, the detent ring 34*c*, and the inner sleeve 30*c* to further tighten the collet 26*c*. The slipping of the detent ring 34*c* relative to the inner sleeve 30*c* produces a click-like sound and tactile feedback to a user as the detent ring 34*c* re-engages the inner sleeve 30*c* indicating that the tool bit 28*c* is properly secured within the chuck 14*c*.

FIGS. 20-22 a loosening operation of the chuck 14*c*. To loosen the collet 26*c* and remove a working tool bit 28*c*, the outer sleeve 42*c* is rotated in a loosening direction opposite the tightening direction. When rotated in the loosening direction, the inclined teeth 120 slip relative to the inclined teeth 100 of the inner sleeve 30, so that the vertical teeth 116 of the second toothed portion 50*c* engage the vertical teeth 96 of the first toothed portion 46*c* to transmit torque to the inner sleeve 30*c*. Once the vertical teeth 116, 96 are engaged, the detent ring 34*c* cannot slip in the loosening direction relative to the inner sleeve 30*c*. Therefore, the detent ring 34*c* transmits a tightening torque to the inner sleeve 30*c* when rotated in the tightening direction and a loosening torque to the inner sleeve 30*c* when rotated the loosening direction. Due to the shape of the first and second toothed portions 46*c*, 50*c*, the detent ring 34*c* is able to transmit a greater amount of tightening torque than loosening torque prior to slipping of the detent ring 34*c*.

Although the invention has been described in detail with reference to certain preferred embodiments, variations and modifications exist within the scope and spirit of one or more independent aspects of the invention as described.

Various features and aspects of the present invention are set forth in the following claims.

What is claimed is:

1. A chuck for use with a rotary power tool having an output spindle, the chuck comprising:
   a base configured to be coupled to the output spindle;
   an inner sleeve coupled to the base, the inner sleeve having a central aperture;
   a collet disposed within the central aperture of the inner sleeve and configured to be engaged by a portion of the inner sleeve to be tightened or untightened;
   a detent member configured to transmit torque to the inner sleeve to tighten or untighten the collet, the detent member axially displaceable relative to the inner sleeve in response to relative rotation between the detent member and the inner sleeve to create tactile feedback; and
   an outer sleeve disposed radially outside the inner sleeve, the outer sleeve at least partially rotationally fixed to the detent member such that rotation of the outer sleeve transmits torque to the detent member causing rotation of the detent member, wherein the detent member transmits torque from the outer sleeve to the inner sleeve to tighten the collet, and
   wherein, when the collet is tightened, rotation of the outer sleeve results in rotation of the detent member relative to the inner sleeve, thereby axially displacing the detent member away from the inner sleeve then towards the inner sleeve to create the tactile feedback.

2. The chuck of claim 1, further comprising a spring configured to bias the detent member towards the inner sleeve.

3. The chuck of claim 2, wherein, after the detent member creates the tactile feedback, rotation of the outer sleeve results in rotation of the detent member and the inner sleeve to further tighten the collet.

4. The chuck of claim 2, wherein the detent member includes a plurality of teeth, and wherein the inner sleeve includes a plurality of teeth engageable with the plurality of teeth of the detent member.

5. The chuck of claim 4, wherein engagement of the teeth on the detent member and the inner sleeve, respectively, allows the transmission of torque from the detent member to the inner sleeve.

6. The chuck of claim 5, wherein, when the collet is tightened, the teeth of the inner sleeve axially displace the detent member relative to the inner sleeve.

7. The chuck of claim 1, wherein the outer sleeve is rotatable in a first direction to tighten the collet, wherein the outer sleeve is rotatable in a second direction opposite the first direction to untighten the collet, and wherein, when the outer sleeve and the inner sleeve are rotated in unison in the second direction, the detent member is not axially displaceable relative to the inner sleeve.

8. A chuck for use with a rotary power tool having an output spindle, the chuck comprising:
   a base;

an inner sleeve threadedly coupled to the base, the inner sleeve having a central aperture;

a collet disposed within the central aperture of the inner sleeve and configured to be engaged by a portion of the inner sleeve to be tightened or untightened;

an outer sleeve surrounding the inner sleeve; and a detent member disposed between the inner sleeve and the outer sleeve, the detent member coupled for co-rotation with the outer sleeve and configured to selectively transmit torque from the outer sleeve to the inner sleeve, a spring configured to bias the detent member into engagement with the inner sleeve, wherein, when the collet is tightened, rotation of the outer sleeve causes axial displacement of the detent member relative to the inner sleeve as the outer sleeve and the detent member rotate relative to the inner sleeve.

9. The chuck of claim 8, wherein the detent member includes a plurality of teeth, wherein the inner sleeve includes a plurality of teeth, and wherein the spring biases the detent member toward the inner sleeve such the plurality of teeth of the detent member engage with the plurality of teeth of the inner sleeve.

10. The chuck of claim 8, wherein, when the collet is tightened, rotation of the outer sleeve causes axial displacement of the detent member against the biasing force of the spring, wherein further rotation of the outer sleeve causes the detent member to re-engage the inner sleeve due to the biasing force of the spring, and wherein re-engagement of the detent member and the inner sleeve causes a tactile feedback for a user.

11. The chuck of claim 10, wherein, after the detent member creates the tactile feedback, rotation of the outer sleeve results in rotation of the detent member and the inner sleeve to further tighten the collet.

12. The chuck of claim 8, wherein the detent member is rotationally fixed relative to the outer sleeve and axially movable relative to the outer sleeve.

13. The chuck of claim 8, wherein rotation of the outer sleeve imparts a torque on the inner sleeve through the detent member, wherein the detent member is configured to transmit a tightening torque to the inner sleeve when the outer sleeve is rotated in a tightening direction, wherein the detent member is configured to transmit a loosening torque when the outer sleeve is rotated in a loosening direction, and wherein the tightening torque is less than the loosening torque.

14. The chuck of claim 13, wherein, when the outer sleeve and the inner sleeve are rotated in unison in the loosening direction, the detent member does not displace relative to the inner sleeve.

\* \* \* \* \*